(12) United States Patent
Schwoegler

(10) Patent No.: US 6,590,529 B2
(45) Date of Patent: Jul. 8, 2003

(54) INDIVIDUALIZED, LOCATION SPECIFIC WEATHER FORECASTING SYSTEM

(75) Inventor: Bruce Schwoegler, Wayland, MA (US)

(73) Assignee: Mysky Communications, Lakeville, MA (US)

( * ) Notice: Subject to any disclaimer, the term of this patent is extended or adjusted under 35 U.S.C. 154(b) by 0 days.

(21) Appl. No.: 09/752,347

(22) Filed: Dec. 29, 2000

(65) Prior Publication Data

US 2001/0030624 A1 Oct. 18, 2001

Related U.S. Application Data

(60) Provisional application No. 60/182,352, filed on Feb. 14, 2000.

(51) Int. Cl.[7] ................................................. G01S 5/14
(52) U.S. Cl. ............................... 342/357.13; 342/357.06
(58) Field of Search ...................... 342/357.01, 357.06, 342/357.13, 357.02, 450, 457, 26

(56) References Cited

U.S. PATENT DOCUMENTS

| | | | |
|---|---|---|---|
| 4,218,755 A | * 8/1980 | Root | 364/900 |
| 5,265,024 A | * 11/1993 | Crabill et al. | 364/443 |
| 5,379,215 A | 1/1995 | Kruhoeffer et al. | |
| 5,717,589 A | 2/1998 | Thompson et al. | |
| 5,734,335 A | * 3/1998 | Brogi et al. | 340/870.05 |
| 5,757,322 A | 5/1998 | Ray et al. | |
| 5,848,378 A | 12/1998 | Shelton et al. | |
| 5,999,882 A | 12/1999 | Simpson et al. | |
| 6,018,699 A | 1/2000 | Baron, Sr. et al. | |
| 6,052,648 A | 4/2000 | Burfeind et al. | |
| 6,112,074 A | 8/2000 | Pinder | |
| 6,188,960 B1 | * 2/2001 | Baron et al. | 702/3 |
| 6,297,766 B1 | 10/2001 | Koeller | |
| 6,298,307 B1 | 10/2001 | Murphy et al. | |

* cited by examiner

Primary Examiner—Dao Phan
(74) Attorney, Agent, or Firm—Iandiorio & Teska

(57) ABSTRACT

An individualized, location specific weather forecasting system in which the location of an electronic device is detected; and weather data is generated and transmitted to the electronic device so that subscribers receive weather forecast data specific to their current location.

35 Claims, 13 Drawing Sheets

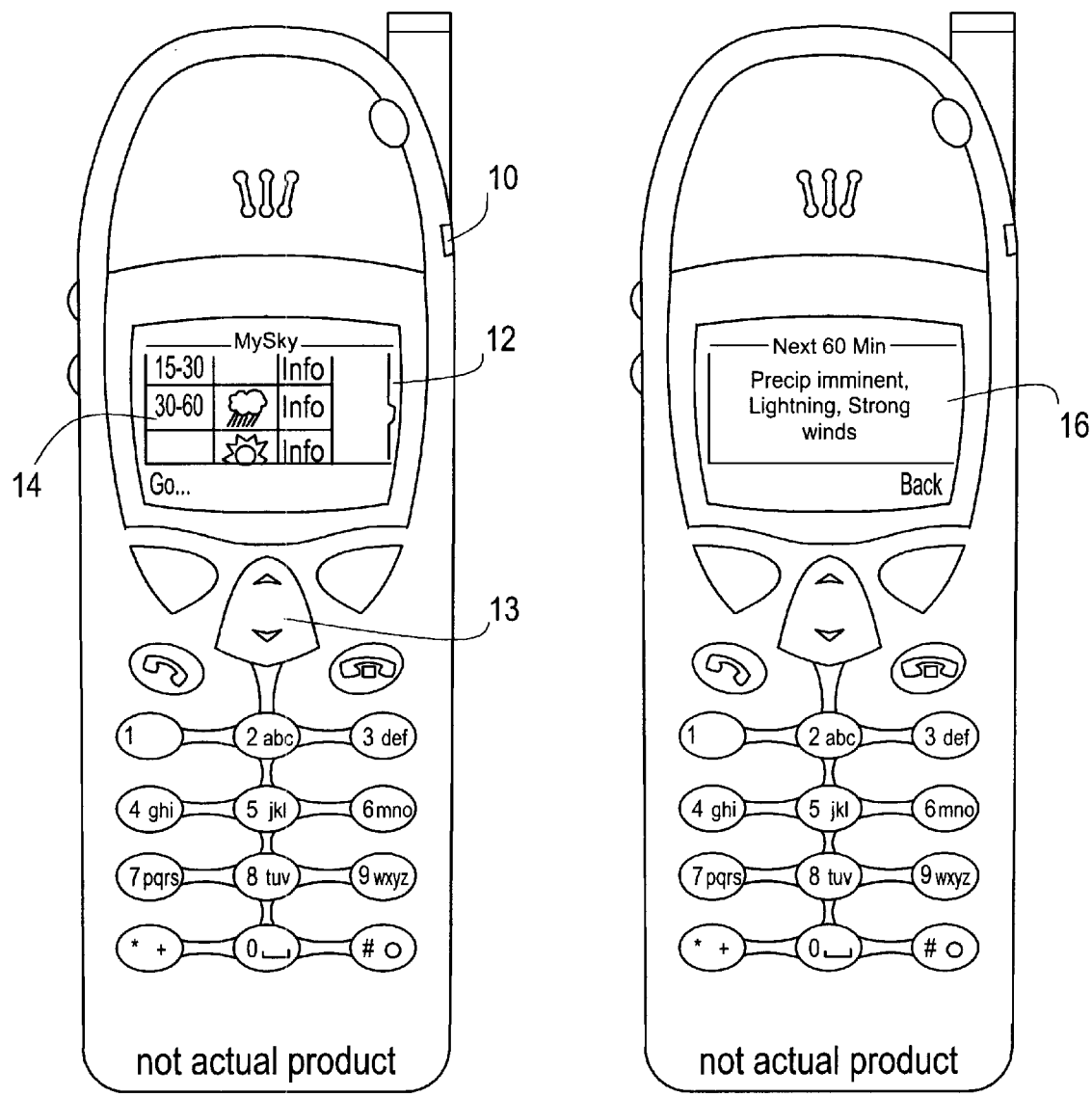
*FIG. 1*     *FIG. 2*

INDIVIDUALIZED, LOCATION SPECIFIC WEATHER FORECASTING SYSTEM

RELATED APPLICATIONS

This application claims as priority provisional application Ser. No. 60/182,352 entitled METHOD AND APPARATUS FOR DELIVERY OF LOCALIZED ENVIRONMENT/WEATHER DATA filed Feb. 14, 2000.

FIELD OF THE INVENTION

This invention relates to an individualized, location specific weather forecasting system which allows users or subscribers to receive weather forecasts specific to their location on wireless mobile electronic devices such as cellular telephones, over the internet (via e-mail) to fixed locations and/or via television or satellite to either mobile or fixed electronic devices.

BACKGROUND OF THE INVENTION

Weather forecasts have typically been communicated to large groups of people en banc by television, radio, and print media. For example, the evening news from local Boston television stations include a segment regarding the weather forecast in the Boston metro area which covers many square miles. Recently, services available at websites such as accuweather.com allow users with a computer to receive weather forecast for somewhat more specific regions.

For improved accuracy, all of these forecasts, however, are based on complex computer models which require as input many different types of weather data. And, such forecasts cannot accurately differentiate between the weather conditions in or predicted for two adjacent towns or the weather conditions expected for two different golf courses in the same town in the next fifteen minutes or half hour.

One focus of recent marketing efforts is the ability to receive information of many different types remotely. That is, cellular telephones allow calls to be made from the automobile or airport and personal data assistants allow e-mails and other computer data to be received at almost any location. Other systems provide information specific to the user's location, i.e., directions and the location of specific hotels and restaurants in the proximity of the consumer wherever the consumer is currently located.

The traditional media outlets, however, will probably never personalize weather forecasts because their relevant market is based on large groups of consumers tuning in at once. On the other hand, other weather forecast service providers which can provide forecasts electronically such as accuweather.com cannot update the accuracy of weather forecasts in near real time because of the use of complex computer models as the basis used by such forecasters to predict the weather. Moreover, the format of these forecasts does not lend them to predicting weather changes over 0–2 hour time frames or for areas as small as ¼ square mile.

There is, however, a distinct need for a consumer to be able to receive current weather forecast information specific to that consumer's current location. Boaters would appreciate a "pocket weather radar" at their disposal. Coaches and parents at a child's ballgame would be able to receive forecasts for the next 15 minutes, the next 30 minutes, and the next 60 minutes specific to a one quarter mile sector including the playing field.

Unfortunately, currently, no system exists for such individualized and location specific weather forecasting.

SUMMARY OF THE INVENTION

It is therefore an object of this invention to provide a novel weather forecasting system.

It is a further object of this invention to provide such a system which provides individualized and location specific weather forecasts.

It is a further object of this invention to provide such a system in which individuals receive accurate and up-to-date weather forecasts irrespective of their location.

It is a further object of this invention to provide such a system which allows users to receive weather forecast information on wireless mobile electronic devices such as cellular telephones.

The invention results from the realization that by automatically detecting the specific location of mobile electronic devices such as a cellular telephone, accurate and real time weather forecast information specific to that location can be automatically transmitted to and displayed on the cellular telephone upon request thereby providing personalized weather information upon demand so that users, even only a few miles apart, will each receive different forecasts as a storm moves through a given region in contrast to traditional radio and television transmissions in which both users receive the same, and therefore, non-specific weather forecast.

This invention features an individualized, location specific weather forecasting system comprising an electronic device; means for detecting the location of the electronic device; means for generating weather data; and a forecasting subsystem, responsive to the weather data and the location of the electronic device which transmits to the electronic device weather forecast data specific to the current location of the electronic device.

The electronic device is typically a wireless mobile electronic device such as a cellular telephone, portable computer and/or personal data assistant. The means for detecting the location of the electronic device may be global positioning systems and cellular telephone tower transmitters.

The forecasting subsystem typically includes a database including a plurality of geographical sectors and, for each sector, weather forecast data unique to each sector as a function of time. An ingest processor, responsive to the weather data, stores weather type data as a function of both location and time. The forecasting subsystem typically includes a prediction processor, responsive to the stored weather data as a function of both location and time, which generates the weather forecast data for each sector for a period of time (e.g., every seven minutes).

The sector size is usually based on the resolution of the means for generating weather data (e.g. precipitation) such as a Doppler radar system. Typical sector sizes are less than five miles or one quarter mile from one (e.g., the user's) specific location.

The forecasting subsystem may further include a server responsive to the location of the electronic device which identifies the electronic device and provides the current weather data to the device. On such server is a wireless application processor. The forecasting subsystem may include a sector processor, responsive to the server, for extracting from the database forecast data from the sector corresponding to the location of the electronic device.

This invention also features a method of providing individualized, location specific weather forecasts. The method includes receiving from a user a request; automatically determining the user's current location; receiving and storing actual weather data unique to each user's location; forecasting the weather for each location based on the actual weather data for that location as a function of time; and transmitting to the user the weather forecast for the user's current location.

The method of providing individualized, location specific weather forecasts according to this invention includes detecting the location of an electronic device; receiving weather data specific to a plurality of geographic sectors; forecasting, based on the received weather data, the weather for each geographic sector; and transmitting to the electronic device upon request forecasted weather information specific to the location of the electronic device.

The electronic device is typically a wireless mobile electronic device such as cellular telephones, portable computers, and personal data assistants.

Detecting the location includes utilizing global positioning satellite data or using information transmitted from the cellular telephone tower closest to the wireless mobile electronic device. Detecting the position may also include using information transmitted from a plurality of cellular telephone towers proximate the wireless mobile electronic device.

Forecasting typically includes storing in a database a plurality of geographic sectors, and, for each sector, weather forecast data unique to each sector. Forecasting may further include periodically updating the weather forecast data unique to each sector, for example, every seven minutes.

The size of each sector is usually based on the resolution of the received weather data. The weather data may be received from a Doppler radar system and the sector size is typically less than five miles from one specific location. In the preferred embodiment, the sector size is approximately one quarter mile from one specific location.

The weather data is typically precipitation data. Receiving and transmitting usually includes utilizing a wireless application processor whereby transmitting includes extracting from the database forecast data for the sector corresponding to the location of the electronic device. The method further includes generating, for each sector, a plurality of weather forecasts, each a function of time.

The forecasting subsystem of the subject invention typically includes an ingest processor programmed to receive weather data unique to specific geographic sectors; a prediction processor, responsive to the ingest processor, programmed to predict the weather for each sector as a function of time; a server programmed to receive a request from an electronic device and location information for said electronic device; and a sector processor programmed to provide, to the server, weather predictions for the sector corresponding to the location information.

The weather forecasting method of this invention includes receiving weather data unique to specific geographic sectors; in response to the received weather data, predicting the weather for each sector as a function of time; receiving a request from electronic device and location information from said electronic device; providing weather predictions for the sector corresponding to the location information; and transmitting said weather predictions to the electronic device.

In one specific embodiment, weather forecast data is transmitted to and displayed on a mobile electronic device such as a cellular telephone.

BRIEF DESCRIPTION OF THE DRAWINGS

Other objects, features and advantages will occur to those skilled in the art from the following description of a preferred embodiment and the accompanying drawings, in which:

FIG. 1 is a schematic front view of a cellular telephone which displays the individualized, location specific weather forecast information generated by the system of the subject invention;

FIG. 2 is a schematic front view of the same cellular telephone shown in FIG. 1 after the user selects a menu icon to then receive more detail whether forecast information;

DISCLOSURE OF THE PREFERRED EMBODIMENTS

Figure 3:
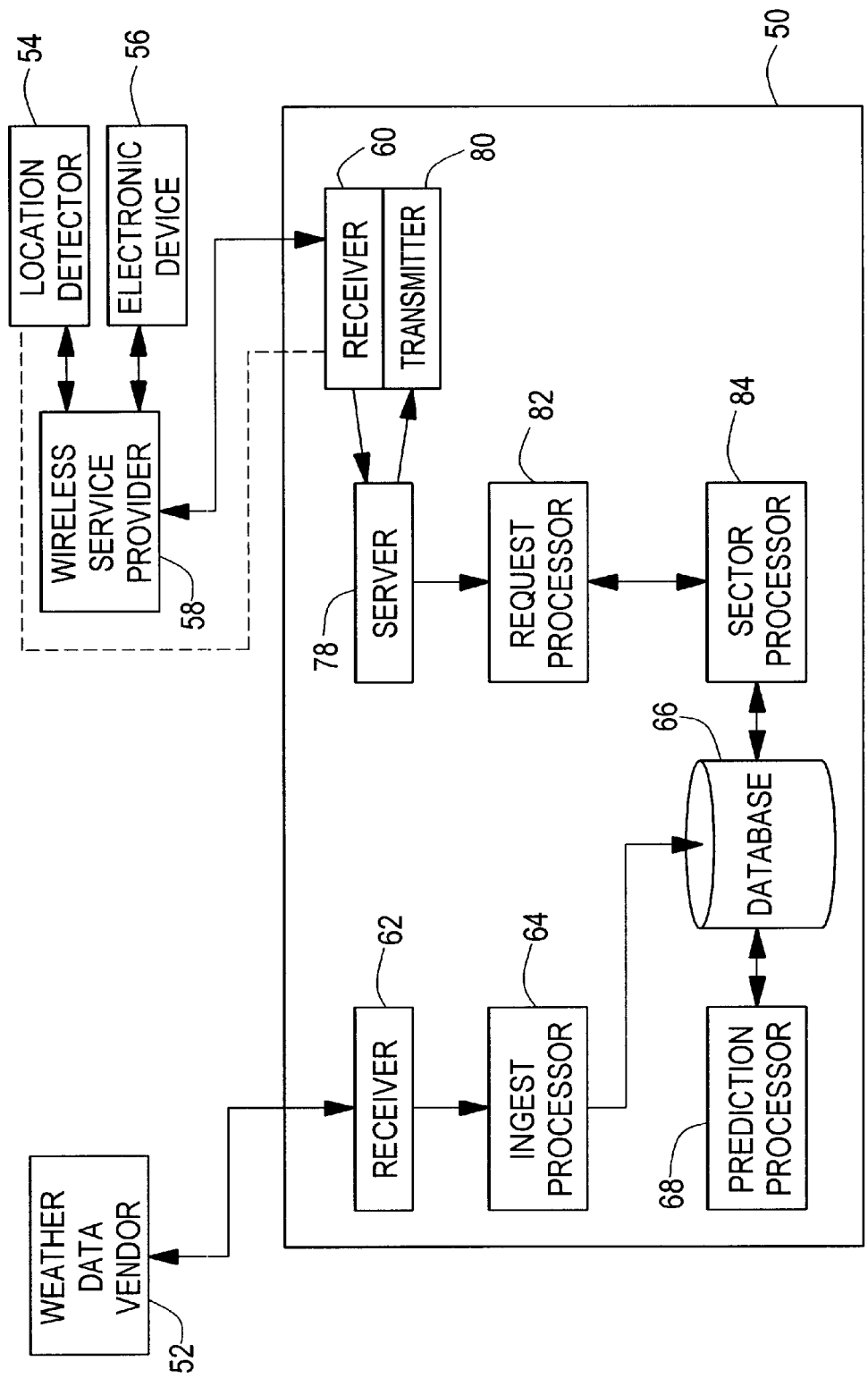
FIG. 3 is a block diagram showing the primary components of the individualized, location specific weather forecasting system of the subject invention.

The individualized, location specific weather forecasting system of the subject invention allows a subscriber or a user to receive, on the viewing screen 12 of cellular phone 10, FIG. 1 weather forecast data 14 specific to the current location of telephone 10.

As shown in FIG. 1, the weather forecast for the next fifteen to thirty minutes is cloudy, and thirty to sixty minutes after that, rain. Sunshine is predicted between the next one and three hours. The user can receive additional more detailed weather data by selecting the arrow keys 13, FIG. 1 as shown in FIG. 2 at 16 for each time interval.

In this way, weather data is provided automatically and related to the user's current position, be it stationary or mobile or current or projected, on small hand held devices such as cellular telephones, pagers, navigators, and minicomputers or personal data assistants. Boaters, for example, would have what is essentially a "pocket radar" at their disposal. No expensive purchase and maintenance of boat-mounted gear would be necessary. In another example, a user may be attending a child's ballgame, and the sky starts to darken. With a simple press of a button on the cellular telephone, the arrival time of rain and/or possibly severe weather would be displayed and described. The proximity of lightning strikes could also be requested. In another example, golfers on a golf course would be able to ascertain whether there is enough time to play 9 or 18 holes before it begins to rain. Trips to shopping centers or even more distant location spots can be better planned and in route weather problems could be displayed and perhaps circumvented by delaying the drive or altering the route. If the subscriber is already underway, the time at which one would emerge from heavy rain or snow can be provided in accordance with the subject invention. This aspect of the inventive system of the subject invention has major implications in the trucking industry including "on-time" delivery services necessitating precise schedule keeping. At home, selection of the service provided by the system of this invention via a personal computer displaying a webpage or portal conveys how many minutes remain before rain or a thunderstorm will threaten a backyard party, gardening, or lawn mowing. In other examples, tornadoes and severe thunderstorms or hurricanes can be charted and precise impacts on the user would be made immediately available.

The primary components associated with the individualized, location specific weather forecasting system and method of the subject invention are shown in FIG. 3. Forecasting subsystem 50 is responsive to weather data received from a means for generating weather data such as weather data vendor 52 and responsive to a means 54 for detecting the current location of electronic device 56. In response to the weather data and the location of electronic device 56, system 50 transmits to electronic device 56 weather forecast data specific to the current location of electronic device 56 which may be a cellular telephone as shown in FIGS. 1–2, a personalized data assistant, a laptop computer, a notebook computer, or other mobile computer, or even a personal computer which is generally stationary within the home or office.

Location detector 54 may be a global positioning subsystem responsive to a global positioning satellite transmissions device separate or integral with electronic device 56 or a subsystem of wireless service provider 58 which locates the position of electronic 56 by noting the position of the cellular tower closest to electronic device 56 and/or by triangulation of the two or three cellular towers in proximity to electronic device 56.

As such, subsystem 50 may be a component of a cellular telephone service provider's command base or sub-base station or switching subsystem for a given geographical region. One or more subsystem 50 may be so located across the United States, North America, or any other continent or geographical region.

Receiver 60 thus receives an identifier which uniquely identifies electronic device 56. Receiver 60 also receives subscriber data representing the current location of electronic device 56. This data is transmitted to receiver 60 either by a GPS subsystem or subsystem or wireless service provider 58 which locates the position of the user in one of the ways described above.

One primary function of subsystem 50 is to associate the location data received by receiver 60 with localized weather forecast information so that the subscriber is presented with accurate weather forecast information for the area within five miles or even within one a quarter mile of electronic device 56.

System 50 receives, through receiver 62, weather data from vendor 52 which may be a National Weather Service (NWS) transmission, doppler radar scans from private installations or NWS, or other vendors. Satellite cloud dissipations could be used in a similar manner.

This data is then processed by ingest processor 64 which stores in database 66 the weather data, the location, and the type of data (e.g., radar, surface, model) as a function of time. Ingest processor 64 may be programmed with the METLAB metrology information program available from 3SI of New Jersey or a similar system. This system features highly flexible, easy-to-use graphic interfaces, extremely fast data access/displays, and automatic generation of weather products without operator interaction.

Figure 4:
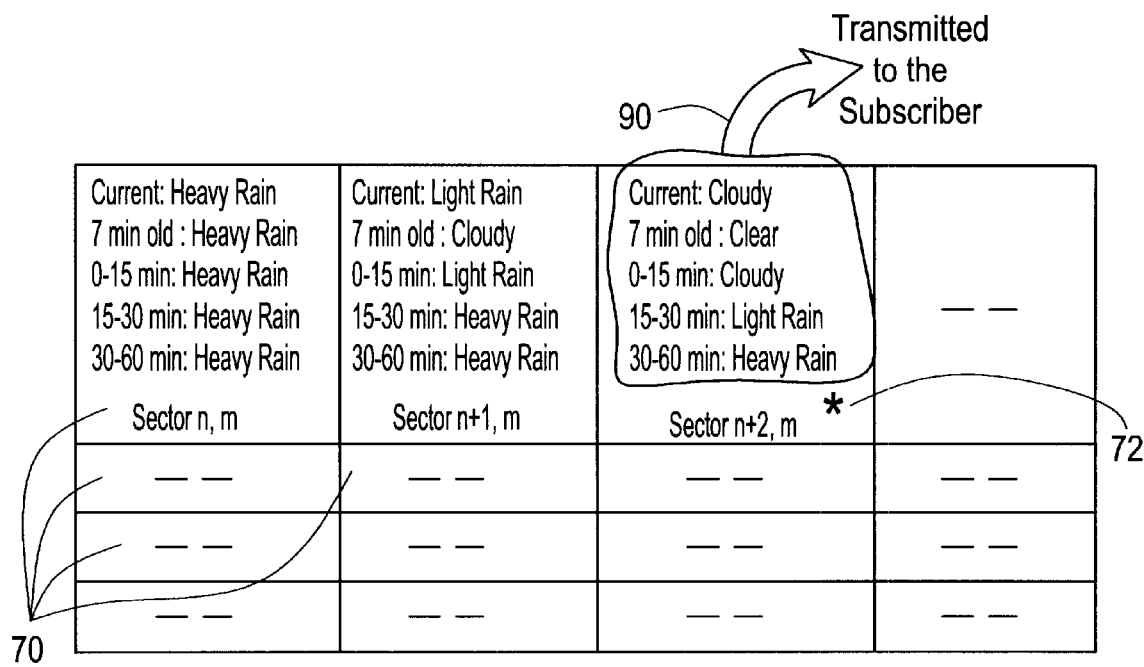
FIG. 4 is a conceptual view of a portion of the database of individualized, location specific weather forecasting system shown in FIG. 3.

Prediction processor 68 is programmed to create weather forecast information at different time intervals (e.g., 15 minutes, 30 minutes, 1 hour . . . ) for each radar site with a typical image resolution of one quarter mile from the user's location based on the data processed by ingest processor 64. Prediction processor 68 stores this weather forecast information in database 66 as conceptually shown in FIG. 4. Each sector 70 represents a geographical region whose size is based on the radar coverage. For Doppler radar weather data, the coverage area is 150 to 230 miles whereas the cell resolution size is currently about one quarter of a mile in each direction from a specific location. Associated with each radar coverage area is the weather forecast data for the current precipitation, the precipitation history, and the precipitation forecast in distinct time intervals in the future as shown in FIG. 4. When a forecast request is received from request processor 82, the forecast products corresponding to the user's location are retrieved from the database 66. Sector processor 84 extracts the cell information for each forecast time and compares the data with other environmental factors such as, wind speed, temperature, land elevation, and previous cell information to determine the precipitation condition. This data is then formatted into a text and image message and sent back to request processor 82 for each forecast time.

As shown in the illustrative example represented by FIG. 4, a rainstorm is currently at sector $_{n,m}$ and moving to sector $_{n+1,m}$ min the next zero to fifteen minutes and to sector $_{+2,m}$ in the next fifteen to thirty minutes. In this way, a subscriber who makes a weather forecast request and who currently is located in sector $_{n+2,m}$ as shown at 72 will be presented with weather forecast information unique to that sector.

By using doppler radar precipitation data in particular as an input to system 50, FIG. 3 in contrast to complex and computational heavy forecast modeling software, forecast processor 68, FIG. 3 is able to update the forecast data base shown in FIG. 4 as often as every seven minutes. Such up-to-date weather forecast information cannot be accomplished with traditional services because they rely on very complex and computational heavy forecast modeling software and, in any event, does not offer a means of rapid updates for a small area to mobile electronic devices such as cellular telephones for display thereon as shown in FIGS. 1–2. The transmission link between system 50 and electronic device 56, FIG. 3 may be wireless or based on wired platforms or a combination of the same including broadband mediums such as cable modems, DSL lines, and high definition television channels.

Referring again to FIG. 3, server 78 (e.g., a wireless device server) receives, from receiver 60, a subscriber's request, the subscriber's location (from location detector 54), and identifier information to process user requests, keep track of billing information, and to translate weather forecast data into the form appropriate for the specific electronic device which will receive, via transmitter 80 and wireless service provider 58, the weather forecast information as shown in FIGS. 1–2.

Server 78 forwards the user's request and location to request processor 82 which functions as a router and load manager. During times of heavy requests, request processor 82 creates additional sector processor 84 to offset the load. Processor 82 then forwards the user's request and location data to sector processor 84 which extracts from database 66 forecast data from the sector corresponding to the location of the user's electronic device as shown by arrow 90 in FIG. 4.

As discussed above, the subscriber in this example has a cellular telephone and is located in a particular radar sector and thus sector processor 84, FIG. 3 is programmed to look up the cell information pertaining to that subscriber to calculate the precipitation condition, and return the request to the request processor 82.

Additionally, a user can set an alarm which will alert the user of precipitation or present lighting detection for up to an hour in advance of the event. The user would set an alarm by selecting the alarm set option from the menu of the mobile device. In turn, the device phone number and location will be collected and stored by wireless device server 78. The alert processor would be activated to monitor the location. All prediction products and lightning data would be monitored for the next hour for each user's request. Once precipitation or present lighting is detected, an alert message is formatted and sent to the wireless device server 78 to notify electronic device 56.

Figure 5:
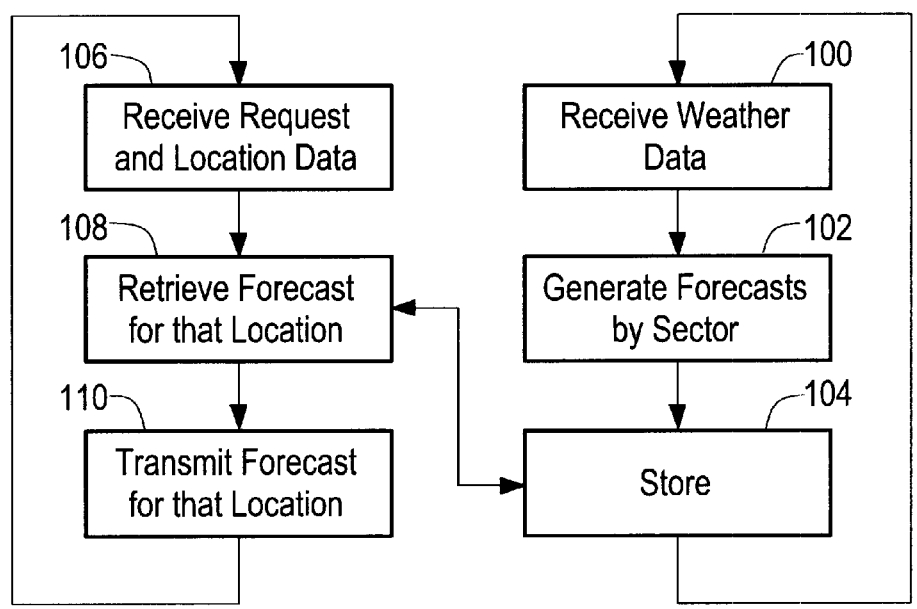
FIG. 5 is a flow chart depicting the primary steps associated with the method of providing individualized, local specific weather forecasts in accordance with the subject invention.

Accordingly, subsystem 50, FIG. 3 operates in general to receive weather data, step 100, FIG. 5 and to generate weather forecast information by sector, step 102 and to store these forecasts, step 104. By using doppler radar as the weather data input at step 100, the stored weather forecasts in step 104 can be updated as often as every 7 minutes. Any time a user transmits a request, that user's location is determined step 106. The forecast information for that location is then retrieved, step 108 and transmitted to the user, step 110.

The general programming associated with and the operation of database 66 and the processors of subsystem 50, FIG. 3 are now explained in further detail.

Figure 6:
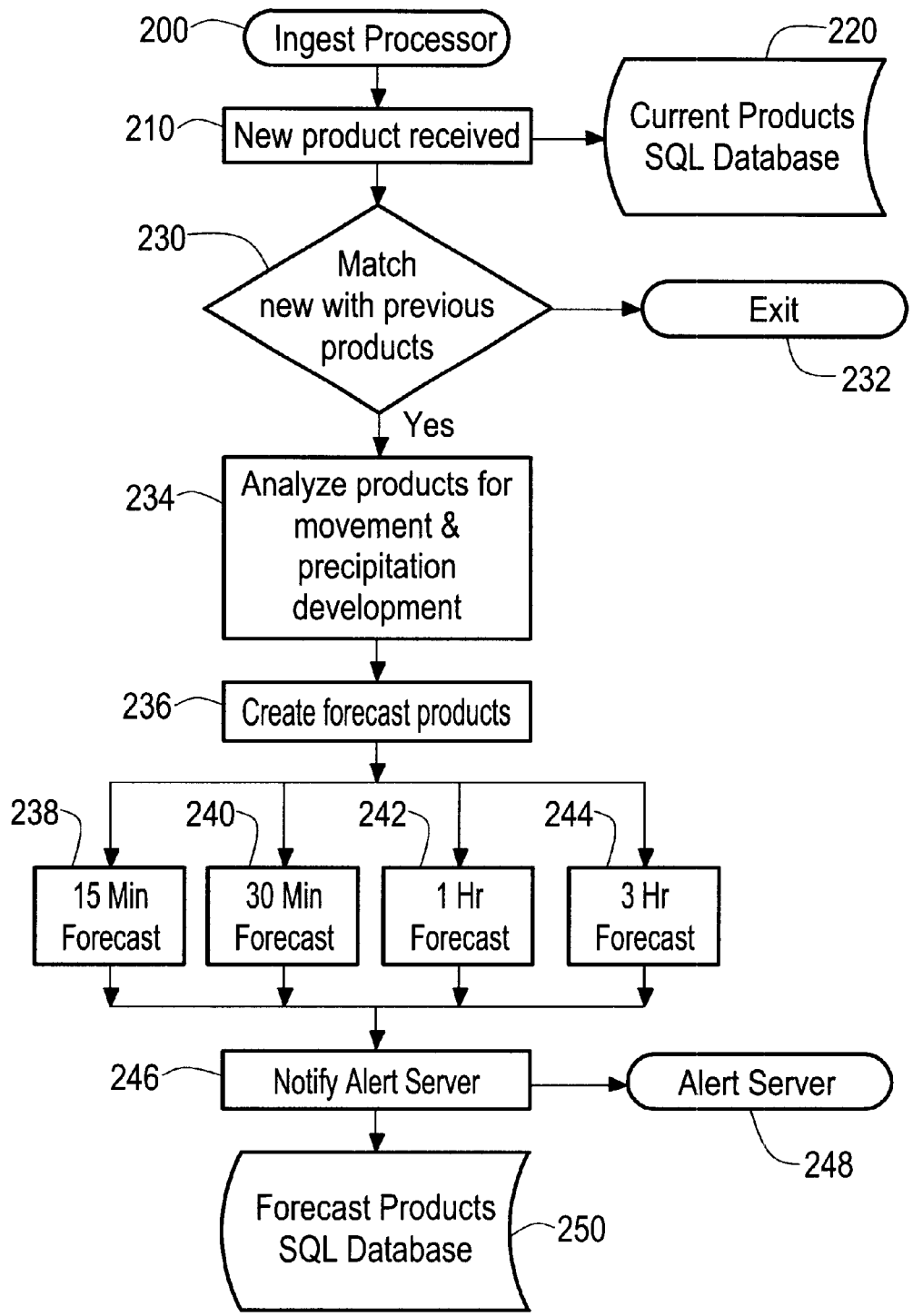
FIG. 6 is a flow chart depicting the programming associated with and the operation of the prediction processor shown in FIG. 3.

The programming associated with prediction processor 68, FIG. 3 is delineated in FIG. 6. The primary functions of the prediction processor include ingesting raw radar products and creating projected forecast images. It also retrieves forecast products upon receiving a request and evaluates the future conditions for a specific location and reports the results to the requester.

In step 210, new radar products are received and prediction processor 68 accesses current products SQL database 220. A match is then performed, step 230 and the raw radar products analyzed for movement and precipitation development information, step 234. In step 236, the prediction processor creates forecast products in 15 minute intervals as shown at step 238, at 30 minute intervals as shown at step 240, provides a 1 hour forecast as shown at step 242, and provides a 3 hour forecast as shown at step 244. The alert server is then notified, step 246 and the new updated forecast products are stored in the SQL database as shown at step 250.

Ingest processor 64, FIG. 3 is responsible for the collection, validation, and decoding of the raw weather data. Weather information is typically collected from a variety of different sources for use in the forecast evaluation process. The ingest processor filters the incoming data stream and saves only the relevant data in the formats needed by the system of the subject invention.

Figure 7:
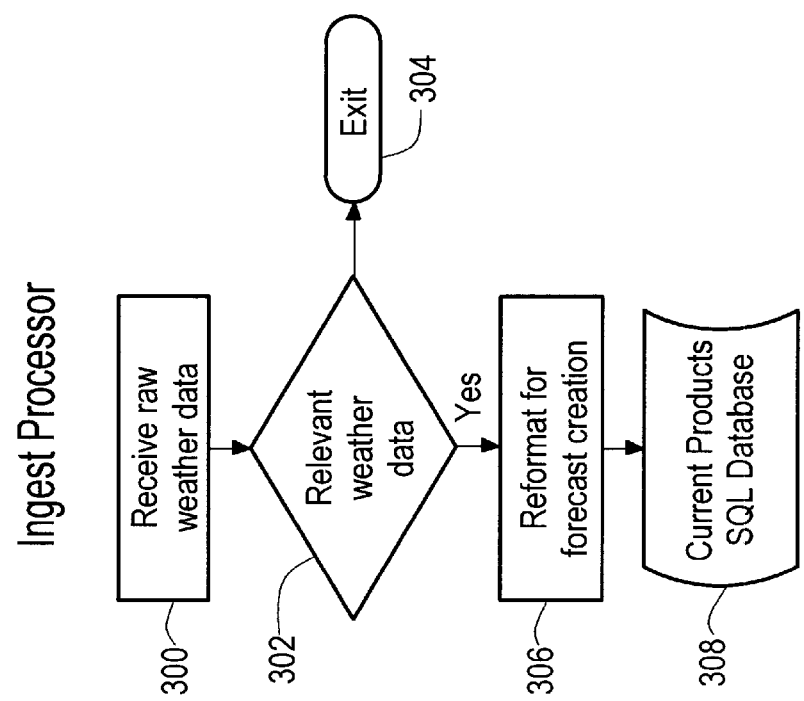
FIG. 7 is a flow chart depicting the programming associated with and the operation of the ingest processor shown in FIG. 3.
Figure 9:
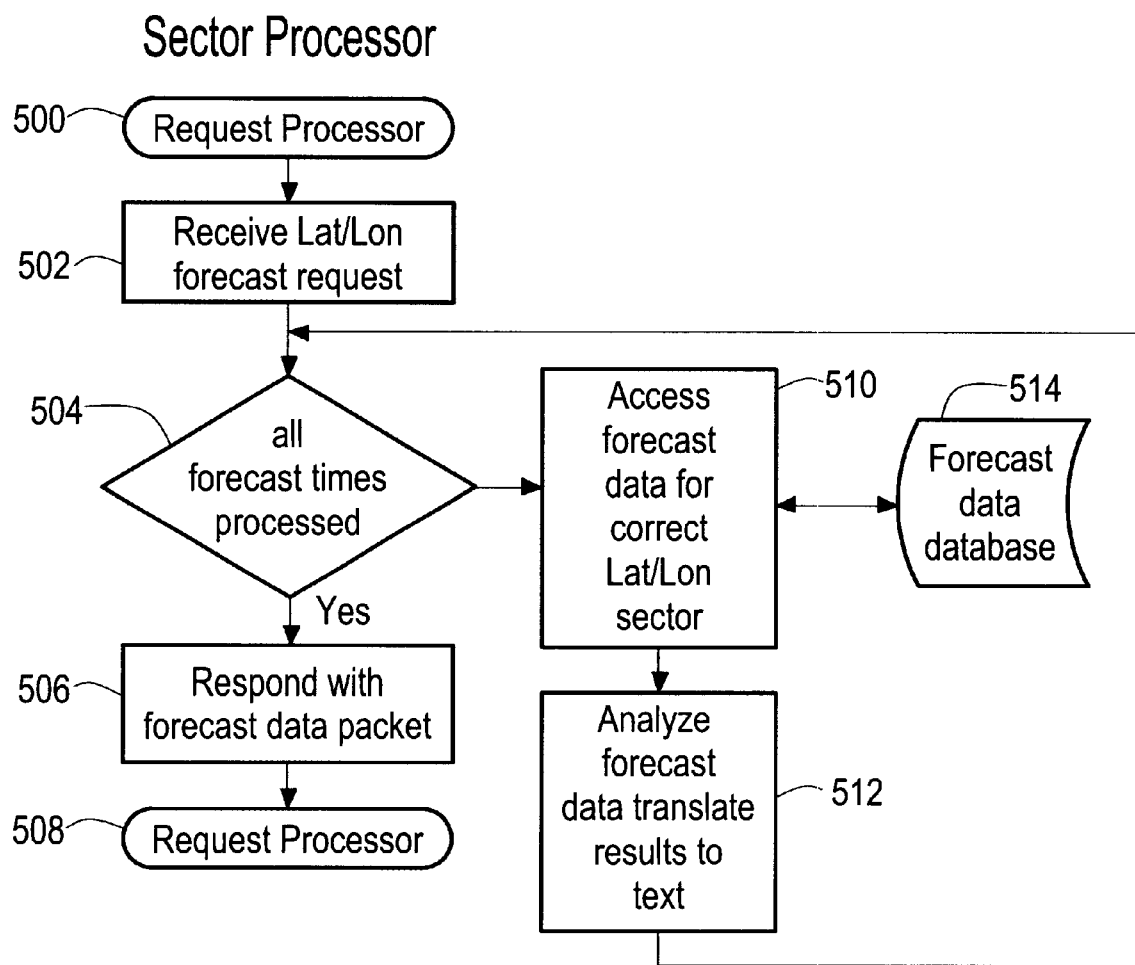
FIG. 9 is a flow chart depicting the programming associated with and the operation of the backend or sector processor shown in FIG. 3.

As shown in FIG. 7, ingest processor 64, FIG. 3 receives raw weather data, step 300 and determines whether the incoming weather data is relevant, step 302. When relevant weather data is received, that data is reformatted for forecast creation, step 306 and stored in the current products SQL database as shown at step 308.

Request processor 82, FIG. 3 is responsible for the management of incoming user request. The request processor also manages the number of sector processors in operation. As a user request is received, it is assigned to a sector processor to evaluate the request. If the number of the request increases, additional sector processors are started to handle the load. When the load decreases, the unneeded sector processors are terminated.

Figure 8:
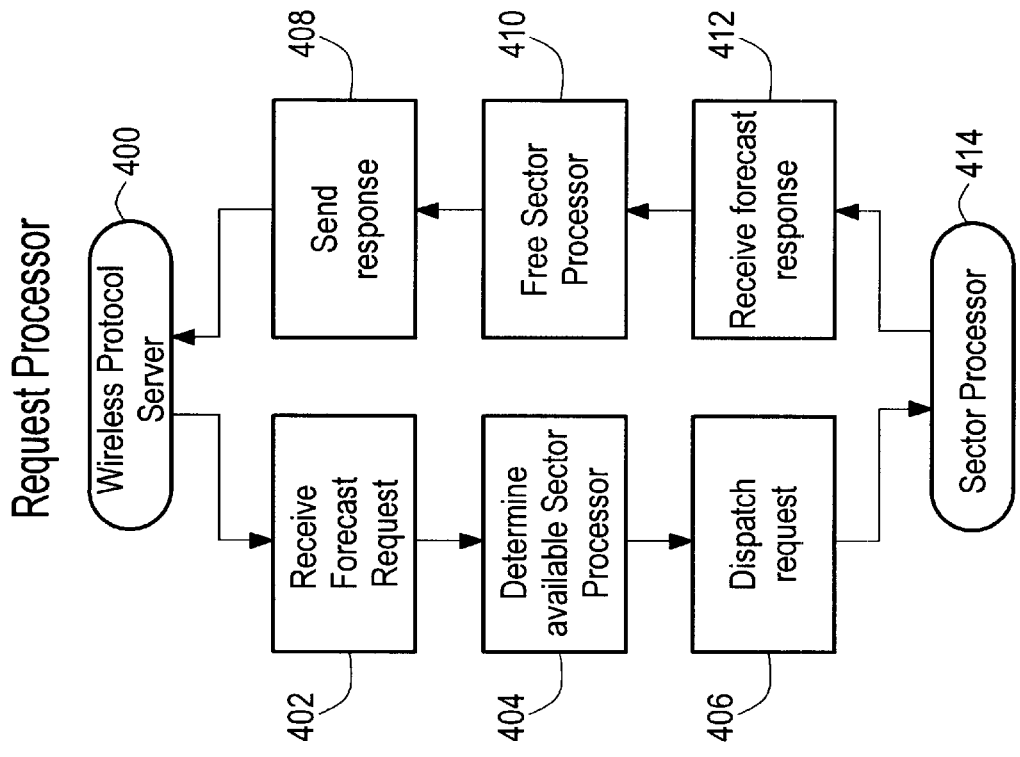
FIG. 8 is a flow chart depicting the programming associated with and the operation of the request processor shown in FIG. 3.

As shown in FIG. 8, information from a wireless protocol server, step 400 is received at step 402 and a determination is made which sector processor is available, step 404. A request is then dispatched, step 406 to the appropriate sector processor step 414. That processor receives the forecast response, step 412 and the forecast processor then frees that sector processor, step 410 and sends a response, step 408.

The job of sector processor 84, FIG. 3 is to identify a specific location specified in a request message and determine the weather condition. To perform this function, the sector processor receives as part of the user request the latitude and longitude for the user's location. The database is then accessed for the relevant weather information containing the forecast for that location. The data is evaluated to determine what the weather conditions are for the specific location and the condition translated into plain text and returned to the request processor.

As shown in step 500, the request processor has been initiated and receives the latitude and longitude forecast request, step 502. All forecast times are processed, step 504 and the database accessed for the correct latitude and longitude sector, steps 510 and 514. The forecast data is analyzed and translated into textual information, step 512. The sector processor then responds with a forecast data packet, step 506 which is transmitted to the request processor, step 508.

Wireless protocol server 78, FIG. 3 provides the interface to the mobile device. This module interacts with and validates the user. In addition, the location of the user is requested from the wireless service provider. Once the location of the user is determined, the weather forecast is sent to the request processor.

Figure 10:
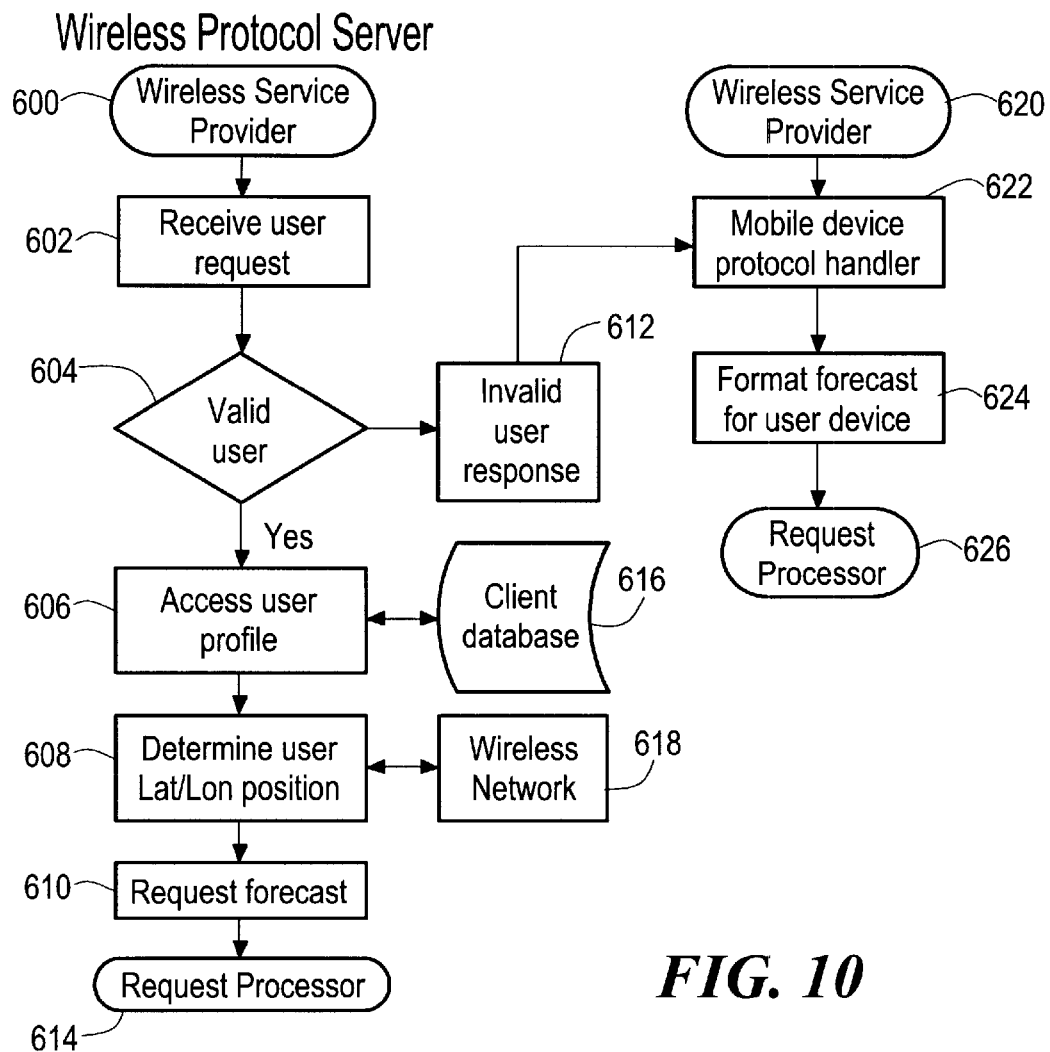
FIG. 10 is a flow chart depicting the programming associated with and the operation of the server shown in FIG. 3.
Figure 11:
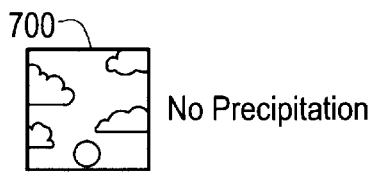
FIGS. 11–14 are depictions of the icons transmitted to a user's cellular telephone or other mobile, handheld electronic device in accordance with this invention.
Figure 12:
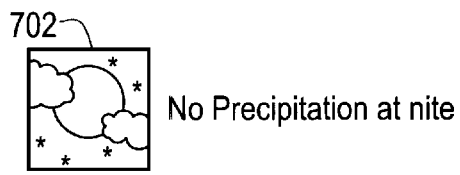
Figure 13:
Figure 14:
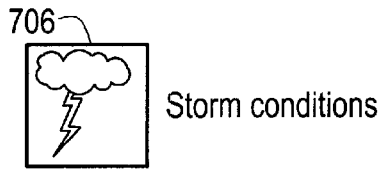

As shown in FIG. 10, a user request is received from the wireless service provider, steps 600 and 602. The user is validated, step 604 and, in the case of an invalid user response, step 612, a mobile device protocol handler is addressed, step 622 based on information from the wireless service provider as shown at step 620 and the user's device is formatted as shown at step 624 based on information provided by the request processor as shown at step 626. Once the user is validated, step 604, the user's profile is accessed, step 606, based on information stored in a client database as shown at 616. The user's latitude and longitudinal position is determined as shown at step 608 based on information provided by the wireless network as shown at step 618. A forecast is then requested, step 610 and that information is supplied to the request processor as shown at step 614.

As stated above, one important aspect of the subject invention is the transmission of weather forecast information to a mobile, hand held electronic device such as a cellular telephone as shown in FIGS. 1–2. Because of the complexity of the output generated by traditional services, weather forecast information from these services cannot provide rapid updates and small area forecast on mobile, hand held electronic devices such as cellular telephones.

And, in any event, such services do not provide high resolution location specific weather information nor can they provide accurate real time weather updates due to the complex, time consuming, and traditional methods employed.

In contrast, in the subject invention, server 78 receives data indicative of the precise location of and type of the user's mobile, hand-held electronic device and provides to it simplified icons as shown in FIGS. 11–14 which are easily interpreted by the user: Icon 700, FIG. 11 denotes no precipitation; icon 702, FIG. 12 denotes no precipitation at night; icon 704, FIG. 13 denotes precipitation; and icon 706, FIG. 14 denotes storm conditions.

By using near real time Doppler radar data in particular, accurate precipitation forecasts in small geographical regions less than 5 miles or even ¼ of a mile away from the location of the subscriber are able to be transmitted to the user in an ergonomic fashion by using the icons shown in FIGS. 11–14 or by using equivalent icons.

Figure 15:
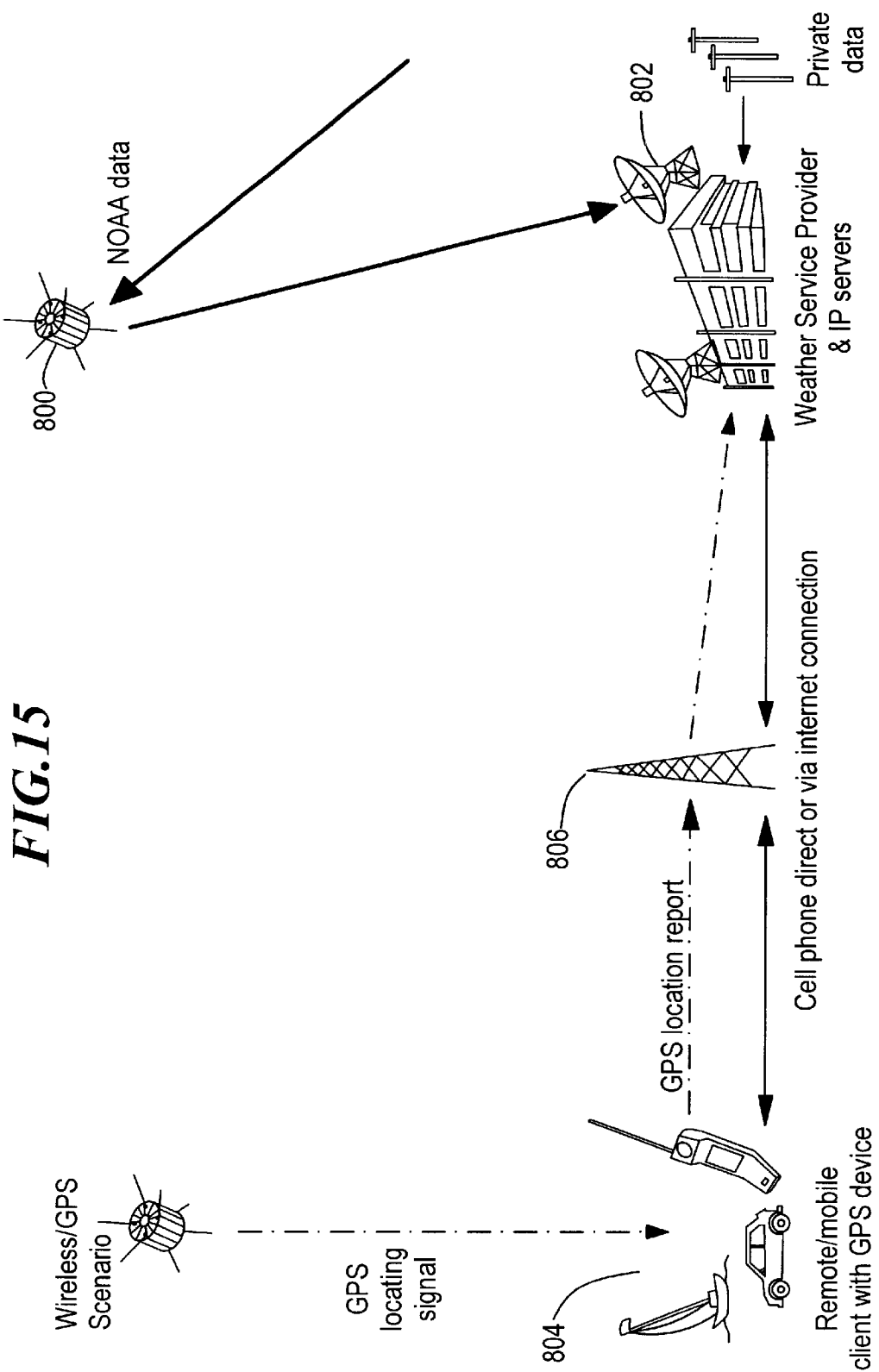
FIG. 15 is a general schematic diagram showing the primary communication and data channels associated with the system of this invention.
Figure 16:
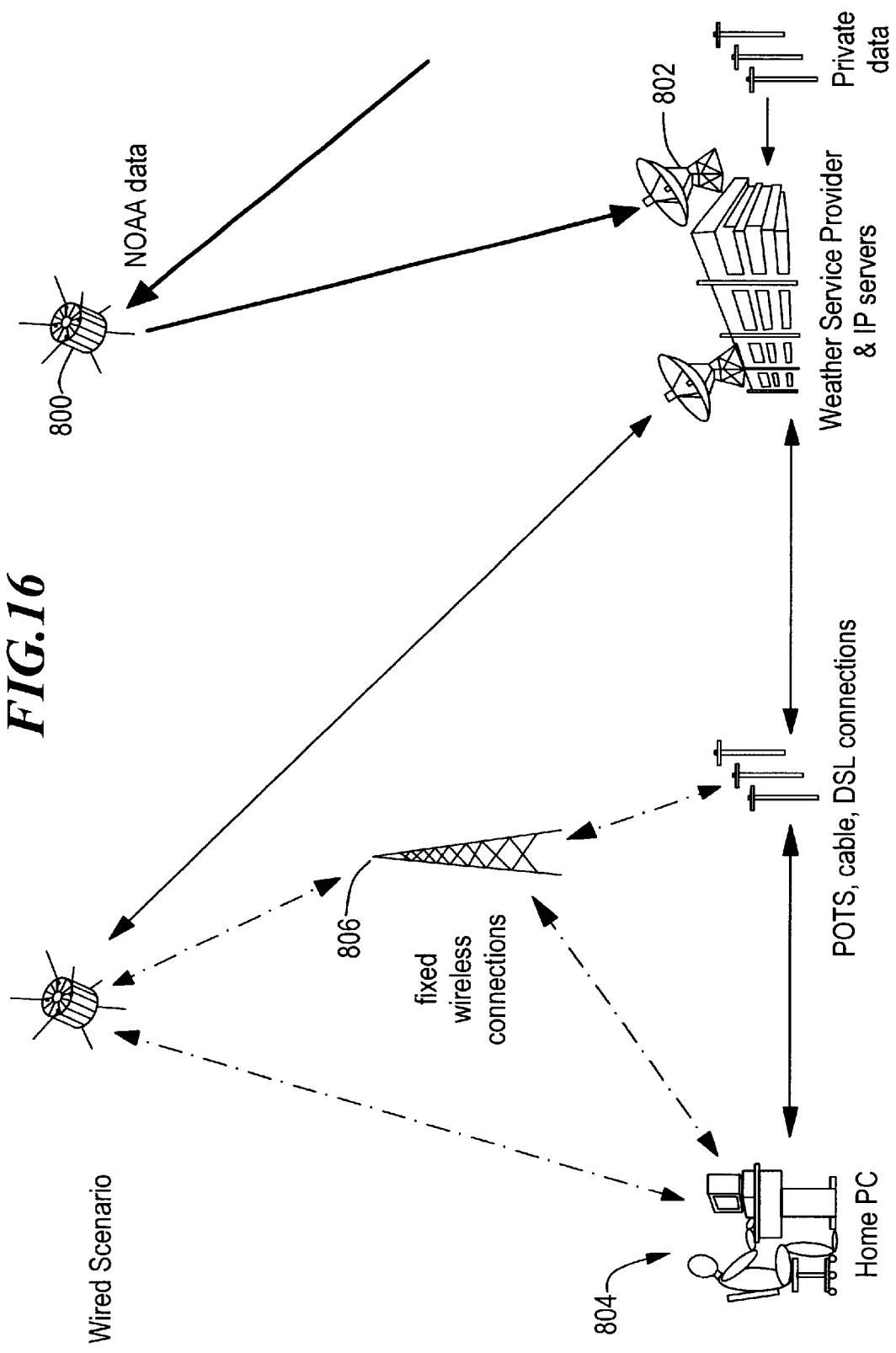
FIG. 16 is a general schematic diagram showing the primary communication and data channels associated with an alternative embodiment of the system of this invention.

In one embodiment of the subject invention, FIGS. 15–16, the source of the localized weather information is a Weather Service Provider (WSP) 802. The WSP receives weather data from the NOAA-National Weather Service, Washington, D.C., via satellite 800. The WSP then enhances (processes) the data it receives with various modeling software. For example, 3SI of New Jersey currently provides a METLAB meteorological information system which features highly flexible, easy-to-use graphic interfaces, extremely fast data access/displays and automatic generation of weather products without operator interaction. In accordance with this invention, WSP 802 will adapt the received weather data, in various forms for end users, either as requested by the end user or automatically, for example to alert the end user of upcoming weather events at the user's location.

NEXRAD data can be downloaded, but requires instrumentation costs for satellite data reception. Another preferred data source is doppler radar scans from private installations, e.g., broadcast facilities and the like, which may also be utilized for backup and/or enhancement of the government's national radar network. NOAA is expected to provide a reasonable source doppler radar based weather data in the near future as well.

The NOAAPORT signal (NOAA data) can be downlinked to WSP facility 802 where, according to one embodiment, all processing, computing and serving may occur. Connectivity to the WSP site can be accomplished via the Internet or leased lines, with links provided by, for example, wire, cable, cell, radio, or satellite as shown at 806. As the customer base expands, there may be a need for regional processing, computing and serving centers to handle demand and provide a faster response to the end users.

All types of alphanumeric and graphical weather data may be available from the WSP site, with the important parameters likely to include: doppler radar images, satellite cloud images, severe weather bulletins, current weather conditions, and weather forecasts for different types of users.

In some cases, the weather data would be processed and immediately sent to user 804 with geographically precise (localized to the user) correlation. For instance, a remote request from a user for a forecast may be answered with a National Weather Service forecast for the user's city or country location. In other cases, additional computing would yield site specific current and projected tracks of a particular weather parameter. For instance, a user's request for more specific information may produce a return message detailing current doppler radar imagery, its projected motion and time of arrival at the user's location. The resolution, in terms of location, may be on the order of less than 0.5 miles.

Such radar and cloud depictions may be integrated with basic mapping features conducive to user orientation. They may include roadway, topography or coastline backgrounds. They may also include a user centered screen presentation free of all clutter, with only a basic "north is up" display. On this or other screens, projected motion of the weather parameter may be displayed in time-divided cones extending outward from the current location, or as a series of future screens with each bearing a future time stamp. All of this information may be sent to the user either via default settings or customized time increments. Audio descriptions could accompany all or part of these data projections.

The weather data provided would automatically relate to the user's position, be it stationary or projected, utilizing basic time, distance and/or course equations both for the weather parameter and the user position. In this way, intercepts of two moving entities (the weather parameter and the user's location) can be calculated and printed on the display screen, as well as stated via voice (e.g., on a cell phone). For certain applications, such as marine or aircraft activity, weather avoidance tactics may also be computed and communicated.

Providing automatic alerts would be very useful prior to severe weather events. Any number of parameters such as wind, lightning, hail or heavy precipitation could be provided with threshold alarms customized to the user. For instance, a lineman working on a utility pole may turn on his PDA before ascending the pole. If lightning were forecast and/or occurred in a 10-mile safety zone around his location, an alarm would sound. These zones would be customizable. Various levels of prewarning alarms could be provided.

Often, severe weather bulletins are issued with little advance warning. Computers at the WSP site may monitor select parameters, such as lightning, and send a "heads up" (prewarning) signal to the user.

With minimal input from the remote user, all of the above could be applied with respect to another (future) user location, for example, be entering the name of the user's destination, e.g., a city or the symbol for an airport. All computing would then be based on this designated site. Similarly, latitude and longitude inputs could be recognized by a computer (processor) as a surrogate location for the desired weather parameter tracking.

Much of the data could be customized to a user profile and delivered in a series of "pushed" screens, sometimes accompanied by voice interpretation or alarm sounds. A website would allow users to configure their units to a particular mode. In this way, PDA keyboard entries could be kept to a minimum, eliminating cumbersome "pull" operations in the field. Where additional information is required, keystrokes may override the customized delivery, as in the destination city example above.

High-resolution color screens on PDA's enhance the display of such weather information for the user. High speed/content interactive wireless communications also enhance the resolution and refresh rate at which the information is provided to users.

Preferably, applications for mobile data users are personalized and meet the unique characteristics of mobile access—timeliness of data provision, accessibility away from home or office, and relation of information to a user's location, or future location.

Wireless application protocol (WAP) is one technology platform for providing such services. WAP is an emerging protocol for wireless Internet access that is slated for use on all digital cellular networks. It is a method for communication web-page-like content to cellular phones. The software for providing such services may be written in wireless markup language (WML), as well as a language suitable for PC or WebTV applications. Voice activation can also be used in conjunction with the subject invention.

Universal Mobile Telecommunications Systems (UMTS) offers very high bandwidth—up to 2 Mbps. In practical terms this means, for instance, a video clip that would in theory take 48 minutes to be downloaded to a mobile phone at 9.6 Kbps, would take just 14 seconds to download to a UMTS-compatible terminal.

As previously described, one aspect of the present invention is to provide a weather related site and software that services wireless personal communicators, as well as more traditional wired networks, with real time environmental information that relates directly to the user's location and projects these environmental parameters into the immediate future (e.g., up to 8 hours).

Although most people can obtain generic weather forecast information delivered by NOAA or the media, they are often not able to obtain user-specific localized weather information for the present and the next, e.g., 6 to 8 hours. Such a time frame is relevant for many activities that are weather dependent and require modification due to changing conditions or faulty forecasts. Many persons need to know how a weather forecast is holding up, particularly when at risk and exposed to weather's vagaries in all types of outdoor endeavors. Trends to more or less severe conditions are especially important.

Small handheld device such as cell phones, pagers, navigators and mini computers are proliferating and increasingly, are combining location functions such as Global Positioning Satellite (GPS) technology. Many such devices are a combination mobile handset and personal computer. Displays on these devices are improving with color and higher resolution. Escalation of data transfer rates is also underway. Many people and businesses will utilize this mobile connectivity and location identification technology for applications of interest. Incorporating a weather delivery application to such connectivity and location-based technology is thus very desirable.

Figure 17:
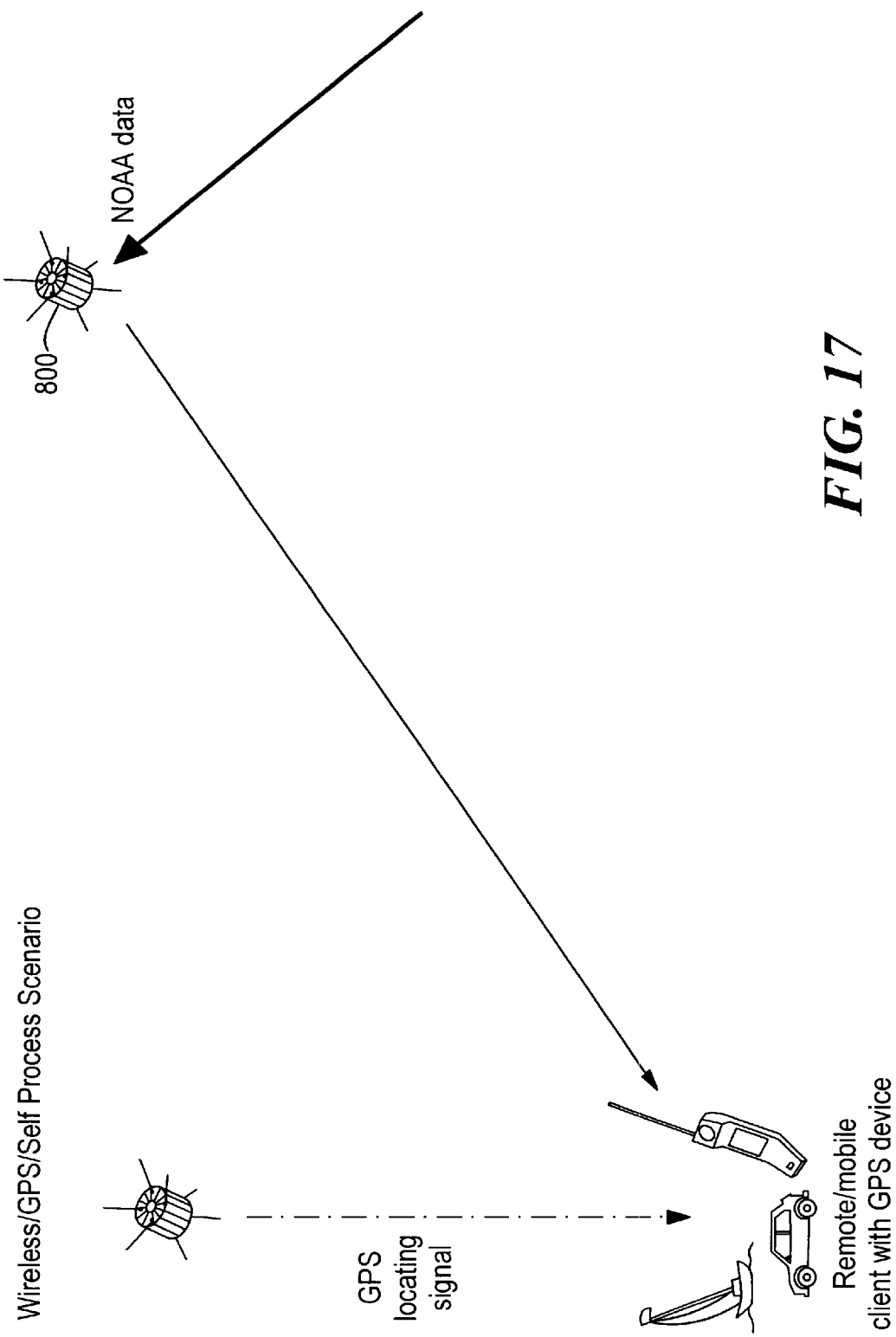
FIG. 17 is a general schematic design showing the primary communication and data channels associated with still another embodiment of the system of this invention.

Portable devices equipped with GPS "know" where they are. In a more general fashion, devices utilizing cell connectivity are approximately positioned via triangulation or cell tower association. This user specific location information can be combined with weather data that also has location imprinted upon it, such as weather graphics, especially radar and cloud depictions. Integrating and processing of such weather and user location information may, in one embodiment, be accomplished at a central facility and sent to the remote device (wired or wireless) for display either exclusively or superimposed over maps or other GPS related backgrounds. In another embodiment, the processing of weather data and user location may be performed at the user location, e.g., by the wireless communication device or an attachment thereto as shown in FIG. 17.

The processed (combined) weather/location information may be displayed in various formats. For instance, a dot in the middle of the user's screen might indicate where the remote device (user) is located, and it may appear in conjunction with a display of weather radar varying in ranges from one to 75 miles outward. The dot may also appear on maps of roadways and coastal or terrestrial locales. Also of importance, the data sets (weather and user location) may have distinct relative motions that may or may not merge. Conveyance of this information via video and/or audio in future time frames yield valuable information regarding changing weather and its impact upon current user position or projected user location.

Commonly available weather information can be delivered along with ancillary environmental data of all kinds. These include wind speed/direction, roadway conditions/delay reports, video cams (from beach, traffic, city and mountain) and video streams from many sources. Keypad entries, touch screens and other command techniques would facilitate "pull" technology for all types of data acquisition and evaluation.

Smaller devices such as PDA's may primarily function in a preset or easily programmable, user friendly "push" mode with pertinent data streaming to the device with no need for interaction. They could even be set for various alarm/alert functions. For instance, a utility lineman could call and activate an alert status for his work site. Then, he would receive a call/beep if weather conditions beyond his locale were worsening and heading his way. Pertinent information such as lightning strikes, wind and precipitation would stream automatically to his device along with projected time of impact.

In a similar manner, National Weather Service severe weather warnings could be disseminated to users who programmed specific parameters. Indeed, a second level of alerts could address the potential for severe weather before official warnings were issued. In either case, a stream of information denoting time of impact at the user location would follow. In all examples, "pull" commands could be invoked at any time to receive more detailed information.

Manufactures of cell phones could offer this weather delivery service with their products—as part of a promotion for the unit, or for the service. Related businesses such as cable and telephony companies could sponsor the service on their networks and/or webpages. Major electronic corporations or information based websites/portals and cable TV networks are other potential service providers. In these and other applications, licensing fees, service fees per connection, fee based PINS or passwords or sponsorships would be an economic incentive for the service provider. Manufacturers of recreation or transportation related goods, public utilities, the travel industry, insurance companies, and even home and garden providers could be end users and/or sponsors.

Specific examples of end users are numerous. Boaters, for instance, would have what is essentially a "pocket radar" at their disposal. No expensive purchase and maintenance of boat-mounted gear would be necessary. An ability to see approaching severe weather, its time of impact and courses to maneuver around it would be invaluable. Alternatively, a user may be attending a child's ballgame, and the skies start to darken. With the simple press of a button, the arrival time of rain and/or possibly severe weather would be displayed and described. The proximity of lightning strikes could also be requested. It is easy to see how this would prove advantageous on a golf course.

Even a trip to a mall or more distant vacation spot would be assisted by this service, either via a PDA or integrated with a vehicle navigation system. Enroute weather problems could be displayed and perhaps circumvented by delaying the drive or changing the route. If underway, times at which one would emerge from heavy rain or snow would be useful. This aspect has major implications in the trucking industry with "on time" deliveries necessitating precise schedule keeping. At home, selection of this service, via a wired PC displaying a web page or portal, would convey how many minutes remained before rain or a thunderstorm would threaten a backyard party, gardening, or lawnmowing. In more extreme examples, tornadoes, severe thunderstorms or hurricanes could be charted, and precise impacts on the user would be immediately available and sent as alarms. Indeed, even before severe warnings were issued, the service would warn of impending danger and give a prewarning of developing storms nearby.

Travelers might select a radar display for a future location by entering, for example, WXRORD, which would place O'Hare airport in the middle screen with radar echoes and their motion/speed/arrival time flashing. The same could be done from a vehicle, utilizing nearby airport codes even city spelling. In either case, the user would receive a preview of the weather at their travel destination. Alternatively, a user may enter "WXR" and receive a picture of a 75 mile area in which he/she is driving. Vehicle GPS systems might be augmented with this extra service. The same is true of a home PC. Adding latitude and longitudinal coordinates to a "cookie" could provide a radar screen tailored just for the user with indications of when weather would hit the backyard pool party.

Another aspect in the delivery of all inclusive weather information is what any destination looks like. Weather, traffic, ski, and beach "cams" could all be accessible via the remote device. One could see the beach they wished to visit, check the winds and temperature, and even the water temperature and wave height, and then check the forecast and current radar to make sure that the day was evolving favorably. Such a service would be invaluable to boaters or aviators having access to wireless transmissions, and everywhere with access to satellite communications. The boaters/aviators would have radar, navigation and environmental sensors in one hand, or mounted in the cockpit. There would be no costly maintenance of the gear.

Biking, hiking, skiing and all other outdoor interests would also find such information useful. Customized weather data would not only provide for more efficient use of leisure time, but it would also ensure greater weather awareness, fostering safety and in some cases, a competitive edge.

Still further, activities such as lawn mowing, fertilizing, pesticide application and many aspects of construction are highly weather dependent. Decisions of when to perform the work (fair weather) and when to purchase supplies (inclement weather) could be readily tied to advertising campaigns. For example, a weather related announcement by a vendor, such as, "Home Depot sees rain ahead . . . get your lawn fertilizer spread" would be beneficial to the vendor (customer of the weather service), as well as to the vendor's customers.

For many customers it would be sufficient to provide all of the localized weather information in audio form. Thus, a cell phone with GPS location capability would be sufficient.

It is preferable for the weather data to be delivered to the user with location information. For example, every pixel of a display may be assigned a latitude and longitude—referred to as "navigated" data. Cloud pictures and satellite pictures are generally navigated.

Modeling software is available for providing location specific weather data. For example, Weather Services International of Billerica, Mass., offers "STORMcast" which projects high resolution radar, "Predictor", a high-resolution model which projects location, intensity and timing of various parameters every half hour for 36 hours on a six-mile grid, and "KITEcast" which gives high-resolution projections of wind. In addition, Weather Central of Madison, Wis. offers "A.D.O.N.I.S.", which provides high-resolution projections of many weather parameters. Still further, Baron Services, Inc. of Huntsville, Ala. offers "FutureScan", which projects high-resolution radar with 99% accuracy on a 15-minute timeline and greater than 90% accuracy on a 30-minute timeline.

Figure 18:
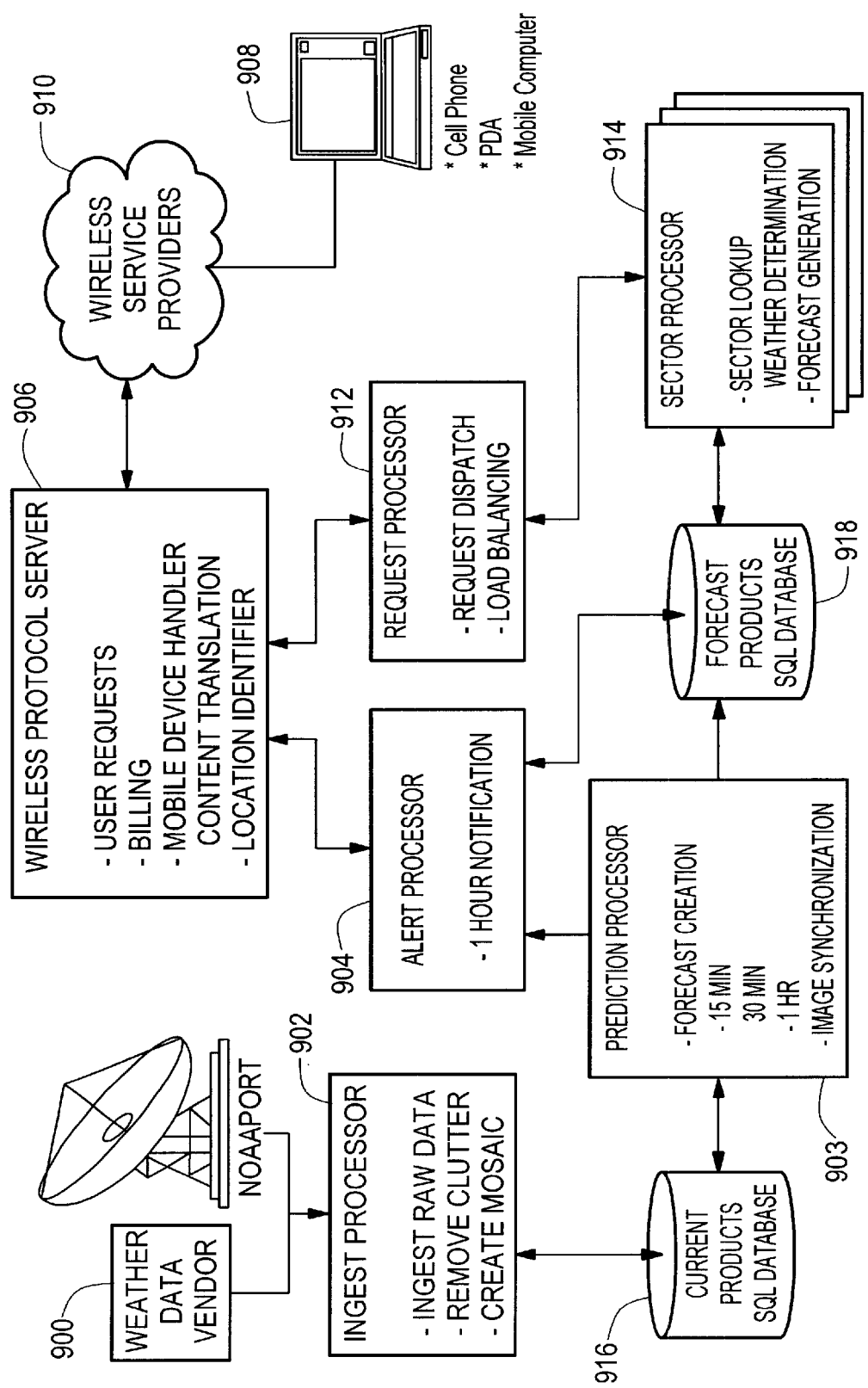
FIG. 18 is a block diagram similar to FIG. 3 with the addition of an alert processor in accordance with one embodiment of the subject invention.

FIG. 18 shows the primary components necessary to collect weather data, predict future forecast, determine a forecast for a specific location, and alert a user of changing conditions of a specific location in one embodiment of the subject invention.

The continuous stream of weather information is collected from weather data vendors 900 based on time and location. This information is decoded and reformatted by ingest processor 902 for database storage in database 916. As new Nexrad products are received, prediction processor 903 is notified and creates and stores in database 918 future products at 15, 30, 60, 120, and 180 minute intervals. This process is updated every 7 minutes (or when the new base reflectivity is available) for all Nexrad sites across the United States. Alert processor 904 receives notice of new products to determine if the user has requested a watch in that sector. If precipitation is detected, alert processor 904 notifies wireless protocol server 906 to inform the user.

When a mobile user 908 requests weather information, they first interact with wireless protocol server 906. This module is responsible for validating the user and formatting all data to conform to the correct mobile device. Wireless protocol server 906 requests the location for the user from service provider 910 and then requests weather information from request processor 912. Request processor 912 manages the request and calls sector processor 914 to determine the weather for the specific location. Once the weather condition is determined, the information is returned to request processor 912.

Alert processor 904 is responsible for the tracking of changing weather conditions for a specific location and reporting precipitation if detected. The alert processor is then formed by the prediction processor when new Nexrad images arrive. If the new product is received containing an area under alert, the alert processor requests the product from the database to determine if precipitation is at a specific location. When precipitation is detected for a specific location, an alert is sent to the wireless protocol server to inform the user of the condition.

Figure 19:
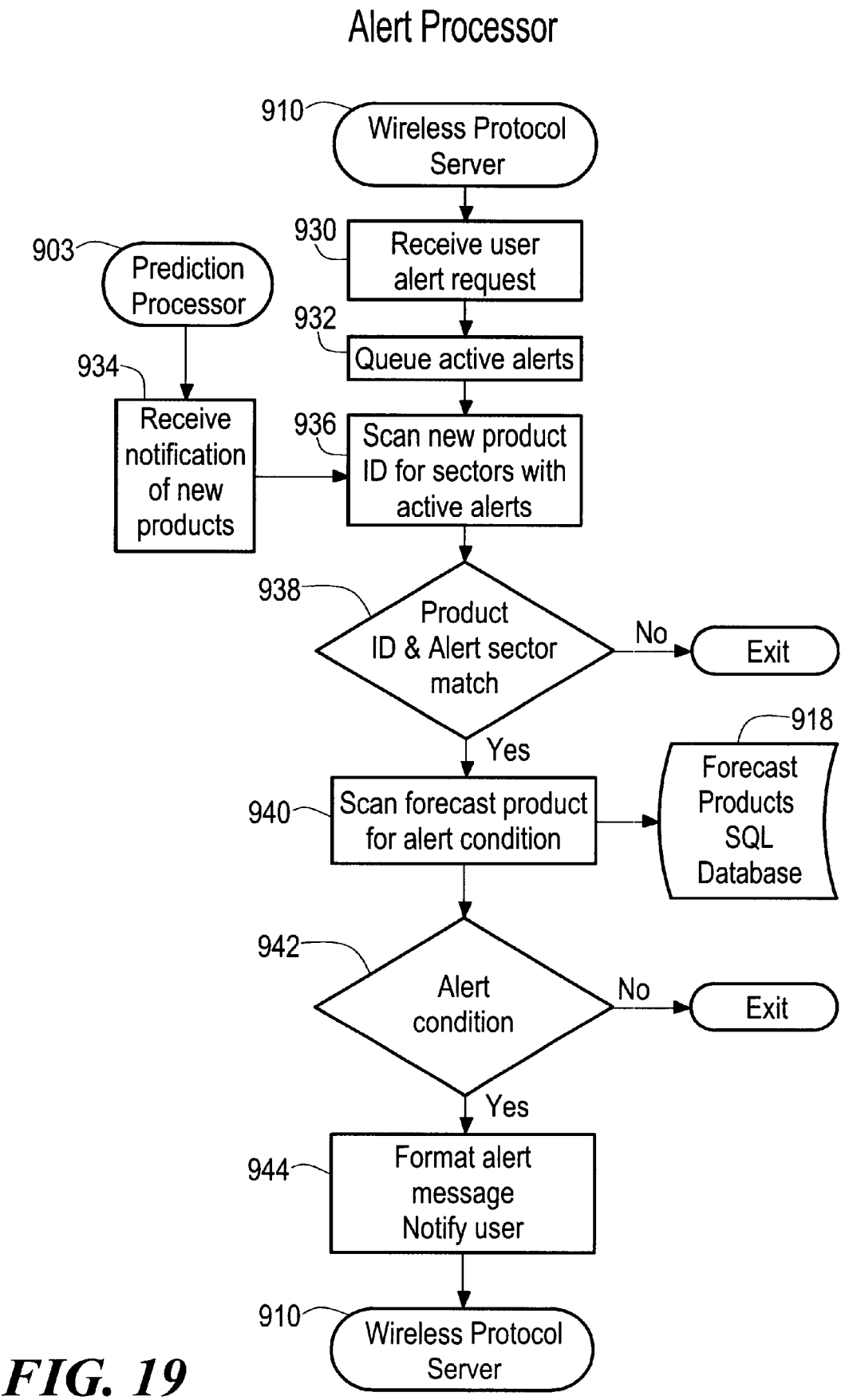
FIG. 19 is a flow chart depicting the operation of and programming associated with the alert processor shown in FIG. 18.

Thus, in FIG. 19, the alert processor receives information from the wireless protocol server as shown at step 910 and receives an alert request from a user as shown at step 930. All the active alerts are cued, step 932, and new products for sectors with active alerts are scanned, step 936 based on the prediction processor providing a notification of new weather products, steps 903 and 934.

In step 938 a product identifier and alert sector match is performed. If there is no match, processing returns to step 930. If a match is found, the forecast product is scanned for an alert condition, step 940 based on information stored in the SQL database, step 918.

If there is an alert condition, step 942 the alert message is formatted and the user is notified, step 944 via the wireless protocol server, step 910.

Figure 20:
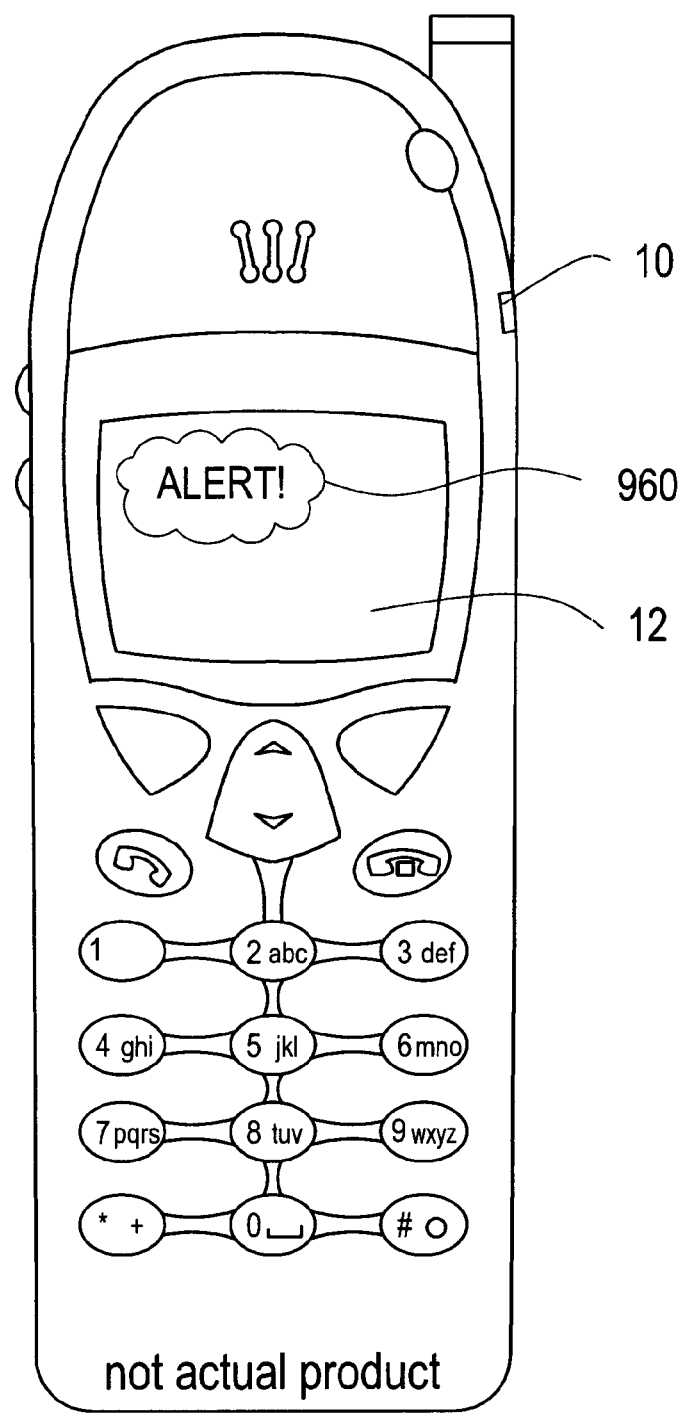
FIG. 20 is a depiction of a weather alert notification provided to the user in accordance with this invention.

One alert notification is shown at 960, FIG. 20 on view screen 12 of cellular telephone 10. By clicking on this icon, the user will receive additional weather details as shown in FIGS. 1–2.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An individualized, location specific weather forecasting system comprising:
   an electronic device;
   means for detecting the location of the electronic device;
   means for generating weather data; and
   a forecasting subsystem, responsive to the weather data and the location of the electronic device, which transmits to the electronic device weather forecast data specific to the current location of the electronic device.

2. The system of claim 1 in which the electronic device is a wireless mobile electronic device.

3. The system of claim 2 in which the wireless mobile electronic device is selected from the group of products consisting of cellular telephones, portable computers and personal data assistants.

4. The system of claim 1 in which the means for detecting the location of the electronic device is selected from the class consisting of global positioning systems and cellular telephone tower transmitters.

5. The system of claim 1 in which the forecasting subsystem includes a database including a plurality of geographical sectors and, for each sector, weather forecast data unique to each sector, each sector having a sector size.

6. The system of claim 5 in which the forecasting subsystem further includes an ingest processor, responsive to the weather data, for storing weather type data as a function of both location and time.

7. The system of claim 6 in which the forecasting subsystem further includes a prediction processor, responsive to the stored weather data as a function of both location and time, which generates the weather forecast data for each sector for a period of time.

8. The system of claim 7 in which said period is every seven minutes.

9. The system of claim 5 in which said sector size is based on the resolution of the means for generating weather data.

10. The system of claim 1 in which the means for generating weather data is a doppler radar system.

11. The system of claim 10 in which the sector size is less than five miles from one specific location.

12. The system of claim 11 in which the sector size is approximately one quarter mile from one specific location.

13. The system of claim 10 in which the weather data is precipitation data.

14. The system of claim 5 in which the forecasting subsystem further includes a server responsive to the location of the electronic device which identifies the electronic device and provides the current weather data to the device.

15. The system of claim 14 in which the server is a wireless application processor.

16. The system of claim 14 in which the forecasting subsystem further includes a sector processor, responsive to the server, for extracting from the database forecast data from the sector corresponding to the location of the electronic device.

17. The system of claim 5 in which the database includes, for each sector, a plurality of weather forecasts each as a function of time.

18. A method of providing individualized, location specific weather forecasts, the method comprising:
   receiving from a user a request;
   automatically determining the user's current location;
   receiving and storing actual weather data unique to each user's location;
   forecasting the weather for each location based on the actual weather data for that location as a function of time; and
   transmitting to the user the weather forecast for the user's current location.

19. A method of providing individualized, location specific weather forecasts, the method comprising:
   detecting the location of an electronic device;
   receiving weather data specific to a plurality of geographic sectors;
   forecasting, based on the received weather data, the weather for each geographic sector; and
   transmitting to the electronic device upon request forecasted weather information specific to the location of the electronic device.

20. The method of claim 19 in which the electronic device is a wireless mobile electronic device.

21. The method of claim 20 in which the wireless mobile electronic device is selected from the group of products consisting of cellular telephones, portable computers, and personal data assistants.

22. The method of claim 21 in which detecting the location includes utilizing global positioning satellite data.

23. The method of claim 21 in which detecting the position includes using information transmitted from the cellular telephone tower closest to the wireless mobile electronic device.

24. The method of claim 21 in which detecting the position includes using information transmitted from a plurality of cellular telephone towers proximate the wireless mobile electronic device.

25. The method of claim 19 in which forecasting includes storing in a database a plurality of geographic sectors, and, for each sector, weather forecast data unique to each sector.

26. The method of claim 25 in which forecasting further includes periodically updating the weather forecast data unique to each sector.

27. The method of claim 26 in which the update period is every seven minutes.

28. The method claim 25 in which the size of each sector is based on the resolution of the received weather data.

29. The method of claim 28 in which the weather data is received form a doppler radar system.

30. The method of claim 28 in which the sector size is less than five miles from one specific location.

31. The method of claim 30 in which the sector size is approximately one quarter mile from one specific location.

32. The method of claim 29 in which the weather data is precipitation data.

33. The method of claim 19 in which receiving and transmitting includes utilizing a wireless application processor.

34. The method of claim 25 in which transmitting includes extracting from the database forecast data for the sector corresponding to the location of the electronic device.

35. The method of claim 25 further including generating, for each sector, a plurality of weather forecasts, each a function of time.

* * * * *